US010675587B2

(12) United States Patent
Nakada et al.

(10) Patent No.: US 10,675,587 B2
(45) Date of Patent: Jun. 9, 2020

(54) EXHAUST PURIFICATION SYSTEM

(71) Applicant: ISUZU MOTORS LIMITED, Tokyo (JP)

(72) Inventors: Teruo Nakada, Yokohama (JP); Takayuki Sakamoto, Fujisawa (JP); Daiji Nagaoka, Kamakura (JP); Hiroyuki Yuza, Yokohama (JP)

(73) Assignee: ISUZU MOTORS LIMITED, Shinagawa-Ku, Tokyo (JP)

(*) Notice: Subject to any disclaimer, the term of this patent is extended or adjusted under 35 U.S.C. 154(b) by 85 days.

(21) Appl. No.: 15/558,180

(22) PCT Filed: Mar. 8, 2016

(86) PCT No.: PCT/JP2016/057169
§ 371 (c)(1),
(2) Date: Sep. 13, 2017

(87) PCT Pub. No.: WO2016/147952
PCT Pub. Date: Sep. 22, 2016

(65) Prior Publication Data
US 2018/0065088 A1 Mar. 8, 2018

(30) Foreign Application Priority Data

Mar. 13, 2015 (JP) ................. 2015-050412

(51) Int. Cl.
F02D 41/04 (2006.01)
F01N 3/08 (2006.01)
(Continued)

(52) U.S. Cl.
CPC ......... B01D 53/9422 (2013.01); B01D 53/94 (2013.01); B01D 53/96 (2013.01);
(Continued)

(58) Field of Classification Search
CPC .... B01D 53/94; B01D 53/9422; B01D 53/96; F01N 3/08; F01N 3/0814; F01N 3/0842;
(Continued)

(56) References Cited

U.S. PATENT DOCUMENTS 6,253,546 B1 * 7/2001 Sun .................. F01N 3/0842
123/295
7,163,007 B2 * 1/2007 Sasaki ................ F01N 3/0814
123/480

(Continued)

FOREIGN PATENT DOCUMENTS

DE 102008002128 A1 12/2008
JP 2002-266629 A 9/2002
(Continued)

OTHER PUBLICATIONS

Extended European Search Report for related EP App No. 16764782.5 dated Jul. 30, 2018, 7 pgs.
(Continued)

Primary Examiner — Matthew T Largi
(74) Attorney, Agent, or Firm — Procopio, Cory, Hargreaves & Savitch LLP

(57) ABSTRACT

An exhaust purification system including a NOx catalyst 32 provided in an exhaust passage of an internal combustion engine 10 and purifying NOx in exhaust; a MAF sensor 40 for acquiring an air flow-rate of the internal-combustion engine 10; a control unit 60, 70 that execute catalyst regeneration treatment of recovering a NOx purification ability of the NOx catalyst 32 by performing, in combination, air-based control of reducing air flow-rate of the internal-combustion engine 10 to a predetermined target air flow-rate and injection-based control of increasing a fuel injection amount, wherein, in a case of executing the catalyst regeneration treatment, the control unit 60, 70 starts with the air-based control and starts the injection-based control when
(Continued)

the air flow-rate acquired by the MAF sensor 40 is reduced to the target air flow-rate.

3 Claims, 10 Drawing Sheets

(51) Int. Cl.

| | | |
|---|---|---|
| *B01D 53/94* | (2006.01) | |
| *B01D 53/96* | (2006.01) | |
| *F01N 3/20* | (2006.01) | |
| *F01N 3/24* | (2006.01) | |
| *F01N 3/36* | (2006.01) | |
| *F02D 43/00* | (2006.01) | |
| *F02D 41/02* | (2006.01) | |
| *F02D 41/30* | (2006.01) | |
| *F02D 41/14* | (2006.01) | |
| *F02D 41/00* | (2006.01) | |
| *F02D 41/18* | (2006.01) | |
| *F02D 41/24* | (2006.01) | |
| *F02D 41/40* | (2006.01) | |

(52) U.S. Cl.
CPC ............ *F01N 3/08* (2013.01); *F01N 3/0814* (2013.01); *F01N 3/0842* (2013.01); *F01N 3/0871* (2013.01); *F01N 3/20* (2013.01); *F01N 3/24* (2013.01); *F01N 3/36* (2013.01); *F02D 41/027* (2013.01); *F02D 41/0275* (2013.01); *F02D 41/04* (2013.01); *F02D 41/1475* (2013.01); *F02D 41/307* (2013.01); *F02D 41/3064* (2013.01); *F02D 43/00* (2013.01); *F01N 2260/04* (2013.01); *F01N 2430/06* (2013.01); *F02D 41/0235* (2013.01); *F02D 41/1454* (2013.01); *F02D 41/1463* (2013.01); *F02D 41/182* (2013.01); *F02D 41/2448* (2013.01); *F02D 41/2454* (2013.01); *F02D 41/405* (2013.01); *F02D 2041/0022* (2013.01); *F02D 2200/0802* (2013.01); *F02D 2200/602* (2013.01); *F02D 2250/21* (2013.01)

(58) Field of Classification Search
CPC . F01N 3/0871; F01N 3/20; F01N 3/24; F01N 3/36; F01N 2260/04; F01N 2430/06; F02D 41/027; F02D 41/0275; F02D 41/04; F02D 41/1475; F02D 2041/0022; F02D 2200/0802; F02D 2200/602; F02D 2250/21; F02D 41/0235; F02D 41/1454; F02D 41/1463; F02D 41/182; F02D 41/2448; F02D 41/2454; F02D 41/405
See application file for complete search history.

(56) References Cited

U.S. PATENT DOCUMENTS

| | | | | |
|---|---|---|---|---|
| 2003/0110760 | A1* | 6/2003 | Shirakawa | ............ F01N 3/0842 60/278 |
| 2006/0005805 | A1* | 1/2006 | Liu | ..................... F02D 41/0275 123/299 |
| 2008/0300770 | A1* | 12/2008 | Kojima | ............... F02D 41/0052 701/103 |
| 2009/0306877 | A1* | 12/2009 | Sasaki | ................... F02D 41/182 701/104 |
| 2011/0041479 | A1* | 2/2011 | Nagaoka | ............ B01D 53/9477 60/286 |
| 2016/0131059 | A1 | 5/2016 | Tsurumi et al. | |

FOREIGN PATENT DOCUMENTS

| | | |
|---|---|---|
| JP | 2002-371889 A | 12/2002 |
| JP | 2003322015 A | 11/2003 |
| JP | 2008-202425 A | 9/2008 |
| JP | 2015-007420 A | 1/2015 |

OTHER PUBLICATIONS

International Search Report and Written Opinion for PCT App No. PCT/JP2016/057169 dated Jun. 7, 2016, 6 pgs.

* cited by examiner

EXHAUST PURIFICATION SYSTEM

CROSS-REFERENCE TO RELATED APPLICATIONS

This application is a U.S. National Stage entry of PCT Application No. PCT/JP2016/057169, filed on Mar. 8, 2016, which claims priority to Japanese Patent Application No. 2015-050412, filed Mar. 13, 2015, the contents of which are incorporated herein by reference.

TECHNICAL FIELD

The present invention relates to an exhaust purification system.

BACKGROUND ART

In the related art, a NOx-occlusion-reduction-type catalyst is known, as a catalyst for reducing and purifying a nitrogen compound (NOx) in exhaust emitted from an internal combustion engine. When the exhaust is in a lean atmosphere, the NOx-occlusion-reduction-type catalyst occludes NOx contained in the exhaust, and when the exhaust is in a rich atmosphere, the NOx-occlusion-reduction-type catalyst detoxifies and releases the occluded NOx with hydrocarbon contained in the exhaust by reduction and purification. For this reason, when a NOx occlusion amount of the catalyst reaches a predetermined amount, it is necessary to periodically perform NOx purge of enriching the exhaust by exhaust pipe injection or post injection so as to recover a NOx occlusion capacity (for example, refer to Patent Documents 1 and 2).

PRIOR ART REFERENCE

Patent Document

Patent Document 1: JP-A-2008-202425
Patent Document 2: JP-A-2002-266629

DISCLOSURE OF THE INVENTION

Problems to be Solved

As the above type of device, a device has been known which decreases an exhaust lambda to a desired target lambda necessary for the NOx purge by performing, in combination, air-based control of reducing an intake air amount to a predetermined target intake air amount and injection-based control of increasing a fuel injection amount when executing the NOx purge.

In the device that performs, in combination, the air-based control and the injection-based control, if rich injection by the injection-based control is started before the intake air amount is reduced to the target intake air amount by the air-based control, it is not possible to effectively decrease the exhaust to the desired target lambda, so that the fuel consumption is deteriorated.

An exhaust purification system of the disclosure is to effectively suppress deterioration in fuel consumption by reliably preventing injection-based control from being started before an intake air amount is decreased to a target intake air amount by air-based control.

Means for Solving the Problems

An exhaust purification system of the disclosure includes a NOx catalyst provided in an exhaust passage of an internal combustion engine and purifying NOx in exhaust, acquisition means for acquiring an air flow-rate of the internal combustion engine, and catalyst regeneration means for executing catalyst regeneration treatment of recovering a NOx purification capacity of the NOx catalyst by performing, in combination, air-based control of reducing the air flow-rate of the internal combustion engine to a predetermined target air flow-rate and injection-based control of increasing a fuel injection amount, wherein, in a case of executing the catalyst regeneration treatment, the catalyst regeneration means starts with the air-based control and starts the injection-based control when the air flow-rate acquired by the acquisition means is reduced to the target air flow-rate.

Further, an exhaust purification system of the disclosure includes a NOx catalyst provided in an exhaust passage of an internal combustion engine and purifying NOx in exhaust, an acquisition unit configured to acquire an air flow-rate of the internal combustion engine and a controller, wherein the controller is operated to execute catalyst regeneration treatment of recovering a NOx purification capacity of the NOx catalyst by performing, in combination, air-based control of reducing the air flow-rate of the internal combustion engine to a predetermined target air flow-rate and injection-based control of increasing a fuel injection amount, and wherein, in a case of executing the catalyst regeneration treatment, the controller starts with the air-based control and starts the injection-based control when the air flow-rate acquired by the acquisition unit is reduced to the target air flow-rate.

Advantageous Effects of Invention

According to the exhaust purification system of the disclosure, it is possible to effectively suppress deterioration in fuel consumption by reliably preventing the injection-based control from being started before the intake air amount is decreased to the target intake air amount by the air-based control.

MODE FOR CARRYING OUT THE INVENTION

Hereinafter, an exhaust purification system in accordance with an illustrative embodiment of the present invention will be described with reference to the accompanying drawings.

Figure 1:
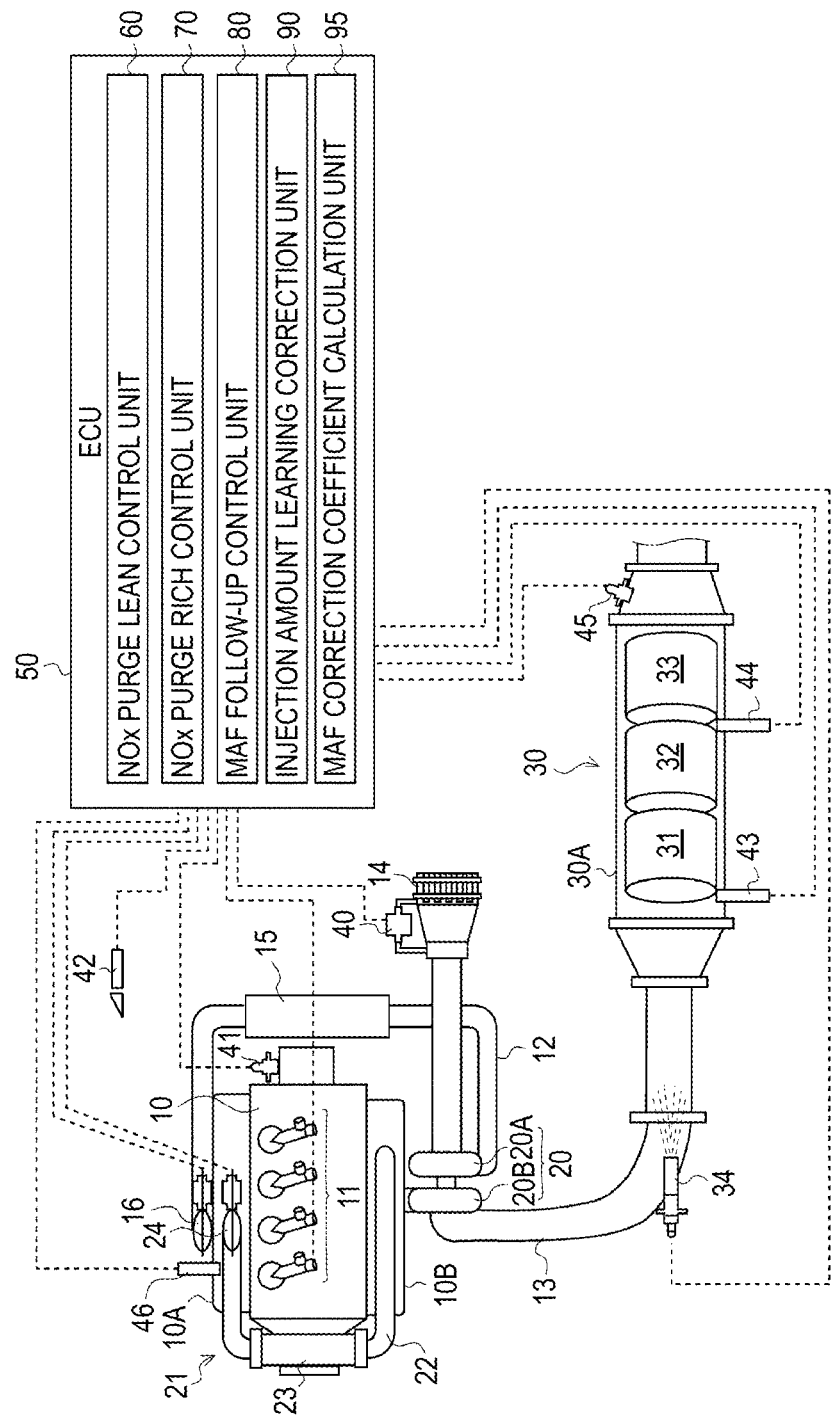
FIG. 1 is an overall configuration view depicting an exhaust purification system in accordance with an illustrative embodiment.

As shown in FIG. 1, each cylinder of a Diesel engine (hereinafter, simply referred to as 'engine') 10 is provided with an injector 11 configured to directly inject high-pressure fuel accumulated to a common rail (not shown) into each cylinder. A fuel injection amount and a fuel injection timing of each injector 11 are controlled in correspondence to instruction signals that are input from an electronic control unit (hereinafter, referred to as 'ECU') 50.

An intake manifold 10A of the engine 10 is connected with an intake passage 12 for introducing therein fresh air, and an exhaust manifold 10B is connected with an exhaust passage 13 for discharging exhaust to an outside. The intake passage 12 is provided with an air cleaner 14, an intake air amount sensor (hereinafter, referred to as 'MAF sensor') 40, a compressor 20A of a variable capacity-type supercharger 20, an intercooler 15, an intake air throttle valve 16 and the like, in corresponding order from an intake upstream side. The exhaust passage 13 is provided with a turbine 20B of the variable capacity-type supercharger 20, an exhaust after-treatment device 30 and the like, in corresponding order from an exhaust upstream side. In the meantime, in FIG. 1, a reference numeral 41 indicates an engine revolution sensor, a reference numeral 42 indicates an accelerator opening degree sensor and a reference numeral 46 indicates a boost pressure sensor.

An EGR (Exhaust Gas Recirculation) device 21 includes an EGR passage 22 configured to connect the exhaust manifold 10B and the intake manifold 10A each other, an EGR cooler 23 configured to cool an EGR gas, and an EGR valve 24 configured to regulate an EGR amount.

The exhaust after-treatment device 30 includes an oxidation catalyst 31, a NOx-occlusion-reduction-type catalyst 32 and a particulate filter (hereinafter, simply referred to as 'filter') 33, which are arranged in a case 30A in corresponding order from the exhaust upstream side. Also, the exhaust passage 13 positioned further upstream than the oxidation catalyst 31 is provided with an exhaust pipe injection device 34 configured to inject unburnt fuel (mainly, hydrocarbon (HC)) into the exhaust passage 13, in response to an instruction signal input from the ECU 50.

The oxidation catalyst 31 is formed by carrying an oxidation catalyst component on a surface of a ceramic carrier such as a honeycomb structure, for example. When the unburnt fuel is supplied by post injection of the exhaust pipe injection device 34 or the injector 11, the oxidation catalyst 31 oxidizes the same to increase an exhaust temperature.

The NOx-occlusion-reduction-type catalyst 32 is formed by carrying alkali metal or the like on a surface of a ceramic carrier such as a honeycomb structure, for example. The NOx-occlusion-reduction-type catalyst 32 occludes NOx in the exhaust when an exhaust air-fuel ratio is in a lean state, and reduces and purifies the occluded NOx with a reducing agent (HC or the like) included in the exhaust when the exhaust air-fuel ratio is in a rich state.

The filter 33 is formed by arranging a plurality of cells, which are divided by porous partition walls, along a flowing direction of the exhaust and alternately plugging upstream and downstream sides of the cells, for example. The filter 33 is configured to trap particulate matters (PM) in the exhaust in fine holes or surfaces of the partition walls, and when an estimated PM accumulation amount reaches a predetermined amount, so-called filter forced regeneration of combusting and removing the accumulated PM is executed. The filter forced regeneration is performed by supplying the unburnt fuel to the upstream oxidation catalyst 31 by the exhaust pipe injection or the post injection and increasing a temperature of the exhaust to be introduced to the filter 33 to a PM combustion temperature.

A first exhaust temperature sensor 43 is provided further upstream than the oxidation catalyst 31 and is configured to detect a temperature of the exhaust to be introduced into the oxidation catalyst 31. A second exhaust temperature sensor 44 is provided between the NOx-occlusion-reduction-type catalyst 32 and the filter 33 and is configured to detect a temperature of the exhaust to be introduced into the filter 33. A NOx/lambda sensor 45 is provided further downstream than the filter 33, and is configured to detect a NOx value and a lambda value (hereinafter, referred to as 'air excess ratio') of the exhaust having passed through the NOx-occlusion-reduction-type catalyst 32.

The ECU 50 is configured to perform a variety of controls of the engine 10 such as injection control and catalyst regeneration treatment of the engine 10 and includes a CPU, a ROM, a RAM, an input port, an output port and the like, which are well known. In order to perform the diverse controls, the ECU 50 is input with sensor values of the sensors 40 to 46. Also, the ECU 50 has, as some functional elements, a NOx purge lean control unit 60, a NOx purge rich control unit 70, an MAF follow-up control unit 80, an injection amount learning correction unit 90 and an MAF correction coefficient calculation unit 95. The functional elements are included in the ECU 50, which is an integral hardware. However, some of the functional elements may be provided in separate hardware.

[NOx Purge Control]

The NOx purge lean control unit 60 and the NOx purge rich control unit 70 are the catalyst regeneration means of the present invention and are configured to execute control of enriching the exhaust and detoxifying and releasing NOx, which is occluded in the NOx-occlusion-reduction-type catalyst 32, by reduction and purification, thereby recovering a NOx occlusion capacity of the NOx-occlusion-reduction-type catalyst 32 (hereinafter, the control is referred to as 'NOx purge control').

The enriching of the exhaust by the NOx purge control is implemented by performing, in combination, NOx purge lean control of lowering an air excess ratio from a value (for example, about 1.5) upon normal operation to a first target air excess ratio (for example, about 1.3) closer to a lean side than a theoretical air-fuel ratio equivalent value (about 1.0) by air-based control and NOx purge rich control of lowering the air excess ratio from the first target air excess ratio to a second target air excess ratio (for example, about 0.9) of a rich side by injection-based control.

In the illustrative embodiment, the NOx purge control starts with NOx purge lean control of reducing an intake air amount by setting a NOx purge lean flag $F_{NPL}$ to an on-state (refer to time $t_1$ in FIG. 2) in a case where: a NOx emission amount per unit time is estimated from an operating state of the engine 10 and an estimated cumulative value $\Sigma NOx$ obtained by cumulatively calculating the emission amounts exceeds a predetermined threshold value; or when a NOx conversion efficiency by the NOx-occlusion-reduction-type catalyst 32 is calculated from a NOx emission amount of a catalyst upstream side, which is estimated from the operating state of the engine 10, and a NOx amount of a catalyst downstream side, which is detected by the NOx/lambda sensor 45, and the NOx conversion efficiency becomes below a predetermined determination threshold value. The NOx purge rich control of increasing the fuel injection amount starts by setting a NOx purge rich flag $F_{NPR}$ to an on-state when the air excess ration is lowered to a first target air excess ratio by the NOx purge lean control (refer to time $t_2$ in FIG. 2).

Hereinafter, the NOx purge lean control and the NOx purge rich control are described in detail.

[Setting of MAF Target Value in NOx Purge Lean Control]

Figure 3:
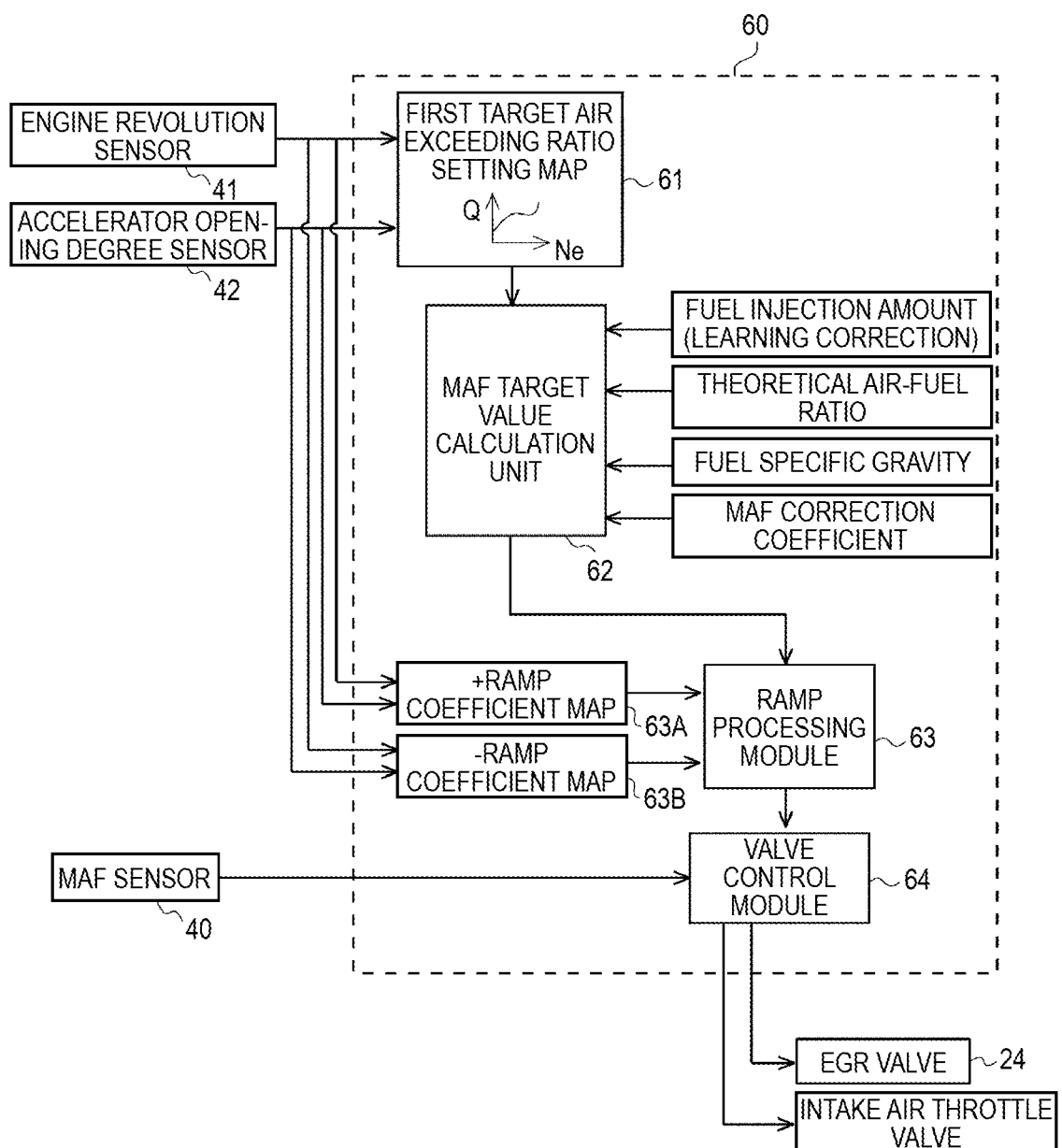
FIG. 3 is a block diagram depicting setting processing of an MAF (Mass Air Flow) target value upon NOx purge lean control in accordance with the illustrative embodiment.

FIG. 3 is a block diagram depicting setting processing of an MAF target value $MAF_{NPL\_Trgt}$, which is to be performed by the NOx purge lean control unit 60. A first target air excess ratio setting map 61 is a map that is to be referred to on the basis of an engine revolution Ne and an accelerator opening degree Q, and an air excess ratio target value $\lambda_{NPL\_Trgt}$ upon NOx purge lean control corresponding to the engine revolution Ne and the accelerator opening degree Q is set in advance by a test and the like.

First, the air excess ratio target value $\lambda_{NPL\_Trgt}$ upon NOx purge lean control is read from the first target air excess ratio setting map 61, in response to the engine revolution Ne and the accelerator opening degree Q, which are input signals, and is then input to an MAF target value calculation unit 62. Also, the MAF target value calculation unit 62 calculates an MAF target value $MAF_{NPL\_Trgt}$ upon NOx purge lean control, based on an equation (1).

$$MAF_{NPL\_Trgt} = \lambda_{NPL\_Trgt} \times Q_{fnl\_corrd} \times Ro_{Fuel} \times AFT_{sto}/Maf\_corr \quad (1)$$

In the equation (1), $Q_{fnl\_corrd}$ indicates a learning-corrected fuel injection amount (the post injection is excluded) (which will be described later), $Ro_{Fuel}$ indicates a fuel specific gravity, $AFR_{sto}$ indicates a theoretical air-fuel ratio, and Maf_corr indicates an MAF correction coefficient (which will be described later).

Figure 2:
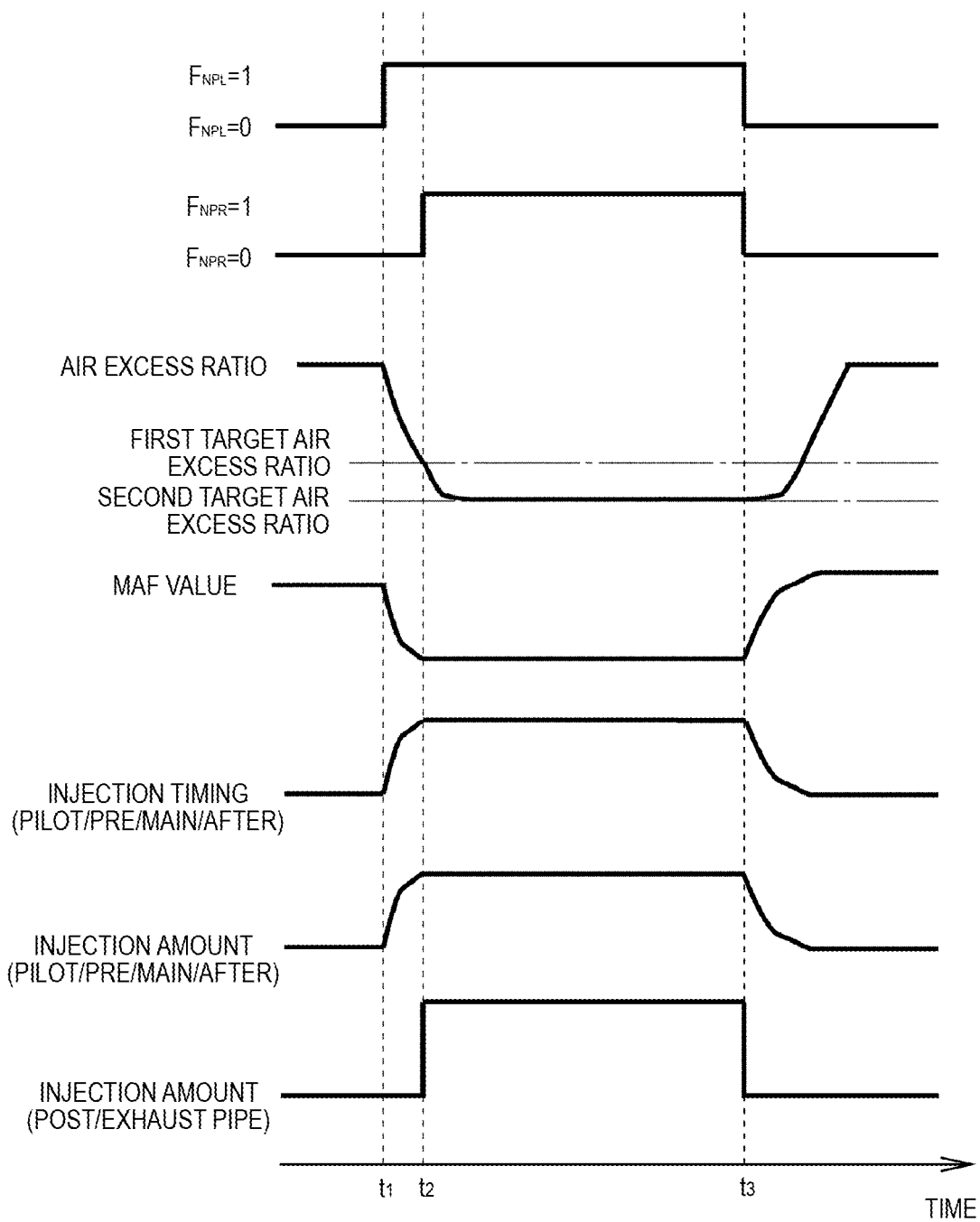
FIG. 2 is a timing chart diagram for illustrating NOx purge control in accordance with the illustrative embodiment.

The MAF target value $MAF_{NPL\_Trgt}$ calculated by the MAF target value calculation unit 62 is input to a ramp processing unit 63 when the NOx purge lean flag $F_{NPL}$ becomes on (refer to time $t_1$ in FIG. 2). The ramp processing unit 63 is configured to read a ramp coefficient from each of ramp coefficient maps 63A, 63B, in response to the engine revolution Ne and the accelerator opening degree Q, which are input signals, and to input an MAF target ramp value $MAF_{NPL\_Trgt\_Ramp}$ to which the ramp coefficient is added to a valve control unit 64.

The valve control unit 64 is configured to execute feedback control of narrowing the intake air throttle valve 16 towards a close side and widening the EGR valve 24 towards an open side so that an actual MAF value $MAF_{Act}$ input from the MAF sensor 40 becomes the MAF target ramp value $MAF_{NPL\_Trgt\_Ramp}$.

In this way, in the illustrative embodiment, the MAF target value $MAF_{NPL\_Trgt}$ is set on the basis of the air excess ratio target value $\lambda_{NPL\_Trgt}$, which is to be read from the first target air excess ratio setting map 61, and the fuel injection amount of each injector 11, and the air-based operation is controlled in the feedback manner on the basis of the MAF target value $MAF_{NPL\_Trgt}$. Thereby, it is possible to effectively lower the exhaust to a desired air excess ratio necessary for the NOx purge lean control without providing a lambda sensor at an upstream side of the NOx-occlusion-reduction-type catalyst 32 or without using a sensor value of a lambda sensor even when the lambda sensor is provided at the upstream side of the NOx-occlusion-reduction-type catalyst 32.

Also, the fuel injection amount $Q_{fnl\_corrd}$ after the learning correction is used as the fuel injection amount of each injector 11, so that it is possible to set the MAF target value $MAF_{NPL\_Trgt}$ in the feed-forward control manner. Therefore, it is possible to effectively exclude influences such as aging degradation and characteristic change of each injector 11.

Also, the ramp coefficient, which is to be set in correspondence to the operating state of the engine 10, is added to the MAF target value $MAF_{NPL\_Trgt}$, so that it is possible to effectively prevent accident fire of the engine 10 due to a rapid change in the intake air amount, deterioration of drivability due to torque variation, and the like.

[Setting of Fuel injection amount in NOx Purge Rich Control]

Figure 4:
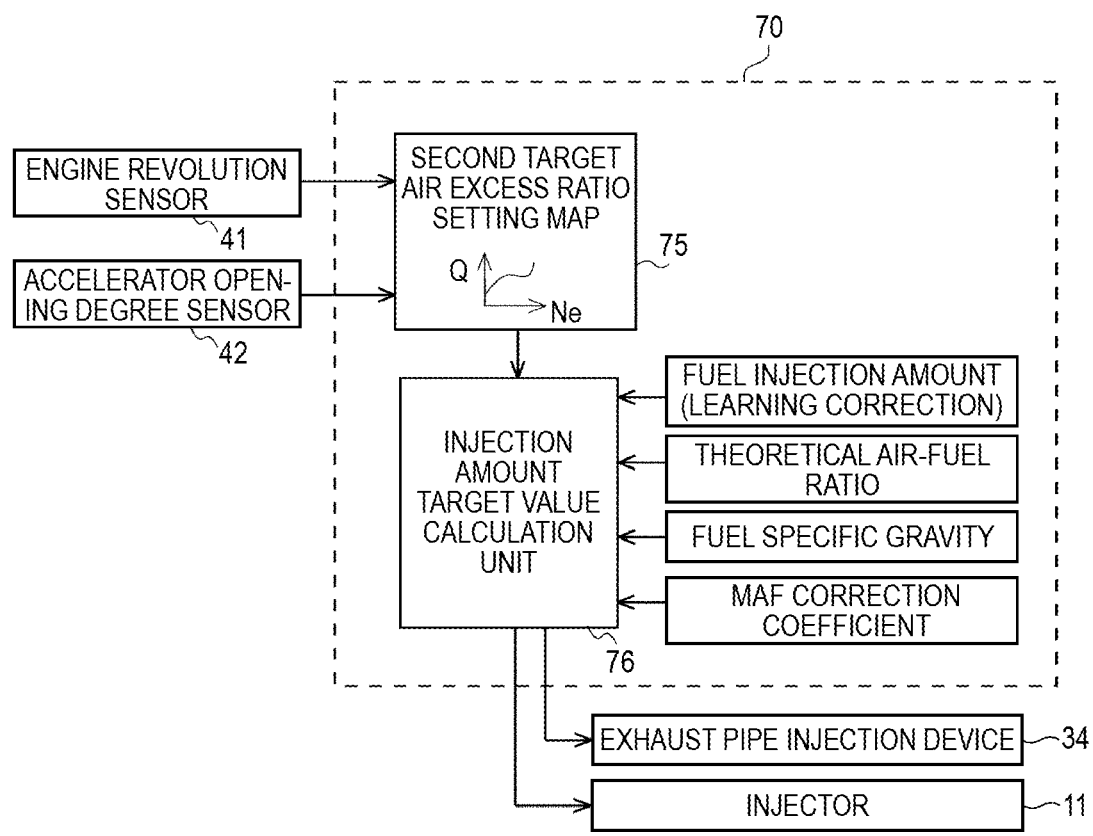
FIG. 4 is a block diagram depicting setting processing of a target injection amount upon NOx purge rich control in accordance with the illustrative embodiment.

FIG. 4 is a block diagram depicting setting processing of a target injection amount $Q_{NPR\_Trgt}$ (injection amount per unit time) of the exhaust pipe injection or the post injection, which is to be performed by the NOx purge rich control unit 70. A second target air excess ratio setting map 75 is a map that is to be referred to on the basis of the engine revolution Ne and the accelerator opening degree Q, and an air excess ratio target value $\lambda_{NPR\_Trgt}$ upon NOx purge rich control corresponding to the engine revolution Ne and the accelerator opening degree Q is set in advance by a test and the like.

First, the air excess ratio target value $\lambda_{NPR\_Trgt}$ upon NOx purge rich control is read from the second target air excess ratio setting map 75, in response to the engine revolution Ne and the accelerator opening degree Q, which are input signals, and is then input to an injection amount target value calculation unit 76. Also, the injection amount target value calculation unit 76 calculates a target injection amount $Q_{NPR\_Trgt}$ upon NOx purge rich control, based on an equation (2).

$$Q_{NPR\_Trgt} = MAF_{NPL\_Trgt} \times Maf_{\_corr}/(\lambda_{NPR\_Trgt} \times Ro_{Fuel} \times AFT_{sto}) - Q_{fnl\_corrd} \quad (2)$$

In the equation (2), $MAF_{NPL\_Trgt}$ is input from the MAF target value calculation unit 62, as a NOx purge lean MAF target value. Also, $Q_{fnl\_corrd}$ indicates a learning-corrected fuel injection amount (the post injection is excluded) before MAF follow-up control (which will be described later) is applied, $Ro_{Fuel}$ indicates a fuel specific gravity, $AFR_{sto}$ indicates a theoretical air-fuel ratio, and $Maf_{\_corr}$ indicates an MAF correction coefficient (which will be described later).

The target injection amount $Q_{NPR\_Trgt}$ calculated by the injection amount target value calculation unit 76 is transmitted to the exhaust pipe injection device 34 or each injector 11 (refer to time $t_2$ in FIG. 2), as an injection instruction signal, when an actual MAF value $MAF_{Act}$ detected by the MAF sensor 40 is lowered to the MAF target value $MAF_{NPL\_Trgt}$ by the NOx purge lean control and the NOx purge rich flag $F_{NPR}$ becomes on. The transmission of the injection instruction signal is continuously performed until the NOx purge rich flag $F_{NPR}$ becomes off (refer to time $t_3$ in FIG. 2) by ending determination of the NOx purge control, which will be described later.

In this way, in the illustrative embodiment, the target injection amount $Q_{NPR\_Trgt}$ is set on the basis of the air excess ratio target value $\lambda_{NPR\_Trgt}$, which is to be read from the second target air excess ratio setting map 75, and the fuel injection amount of each injector 11. Thereby, it is possible to effectively lower the exhaust to a desired air excess ratio necessary for the NOx purge rich control without providing a lambda sensor at the upstream side of the NOx-occlusion-reduction-type catalyst 32 or without using a sensor value of a lambda sensor even when the lambda sensor is provided at the upstream side of the NOx-occlusion-reduction-type catalyst 32.

Also, the fuel injection amount $Q_{fnl\_corrd}$ after the learning correction is used as the fuel injection amount of each injector 11, so that it is possible to set the target injection amount $Q_{NPR\_Trgt}$ in the feed-forward control manner. Therefore, it is possible to effectively exclude influences such as aging degradation and characteristic change of each injector 11.

[Ending Determination of NOx Purge Control]

In a case where any one of conditions that (1) the injection amounts of the exhaust pipe injection or the post injection are accumulated from the on-state of the NOx purge rich flag $F_{NPR}$ and the accumulated injection amount reaches a predetermined upper limit threshold value amount, (2) the elapsed time measured from the start of the NOx purge control reaches predetermined upper limit threshold value time and (3) a NOx occlusion amount of the NOx-occlusion-reduction-type catalyst 32, which is calculated on the basis of a predetermined model equation including, as input signals, an operating state of the engine 10, a sensor value of the NOx/lambda sensor 45 and the like, is lowered to a predetermined threshold value indicative of NOx removal success, is satisfied, the NOx purge lean flag $F_{NPL}$, and the NOx purge rich flag $F_{NPR}$ are set to off-states and the NOx purge control is over (refer to time $t_3$ in FIG. 2).

In this way, in the illustrative embodiment, the upper limits of the accumulated injection amount and the elapsed time are provided with respect to the ending conditions of the NOx purge control, so that it is possible to reliably prevent the fuel from being excessively consumed when the NOx purge fails due to the decrease in the exhaust temperature and the like.

[MAF Follow-Up Control]

The MAF follow-up control unit 80 is configured to execute control of correcting a fuel injection timing and a fuel injection amount of each injector 11 in correspondence to MAF change (1) for a switching time period from a lean state of normal operation to a rich state by the NOx purge control and (2) for a switching time period from the rich state by the NOx purge control to the lean state of normal operation (hereinafter, this control is referred to as 'MAF follow-up control').

When a large amount of EGR gas is introduced into a combustion chamber of the engine 10 by the air-based operation of the NOx purge lean control, an ignition delay is caused at the same fuel injection timing as the lean state of normal operation. For this reason, when switching a state from the lean state to the rich state, it is necessary to advance the injection timing by a predetermined amount. Also, when switching a state from the rich state to the lean state of normal operation, it is necessary to return the injection timing to a normal injection timing by delay. However, the advance or delay of the injection timing is performed more rapidly than the air-based operation. For this reason, the advance or delay of the injection timing is completed before the air excess ration reaches the target air excess ratio by the air-based operation, so that the drivability may be deteriorated due to rapid increases in NOx generation amount, combustion noise, torque and the like.

Figure 5:
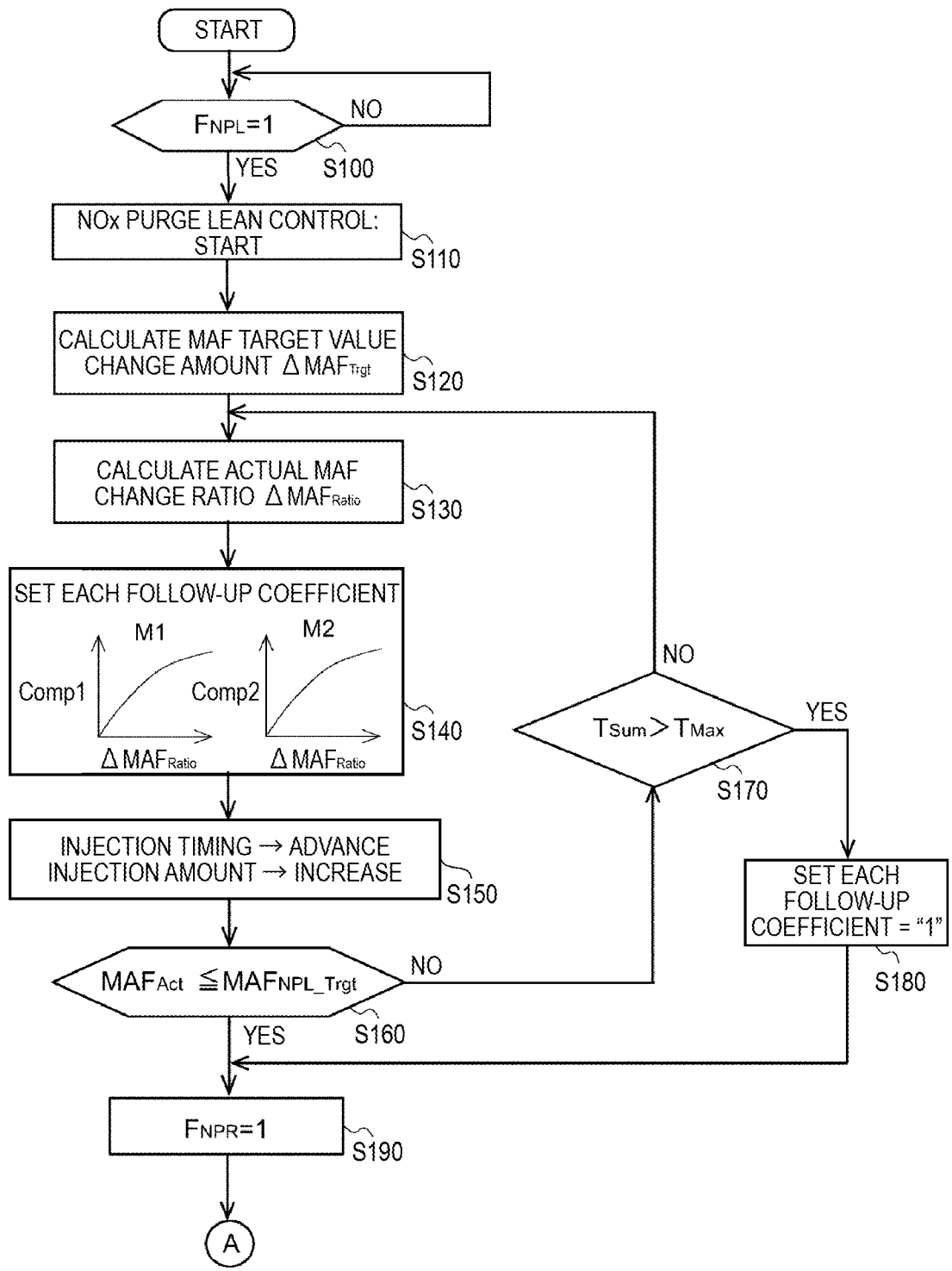
FIG. 5 is a flowchart depicting switching of MAF follow-up control from a lean state to a rich state in accordance with the illustrative embodiment.
Figure 7:
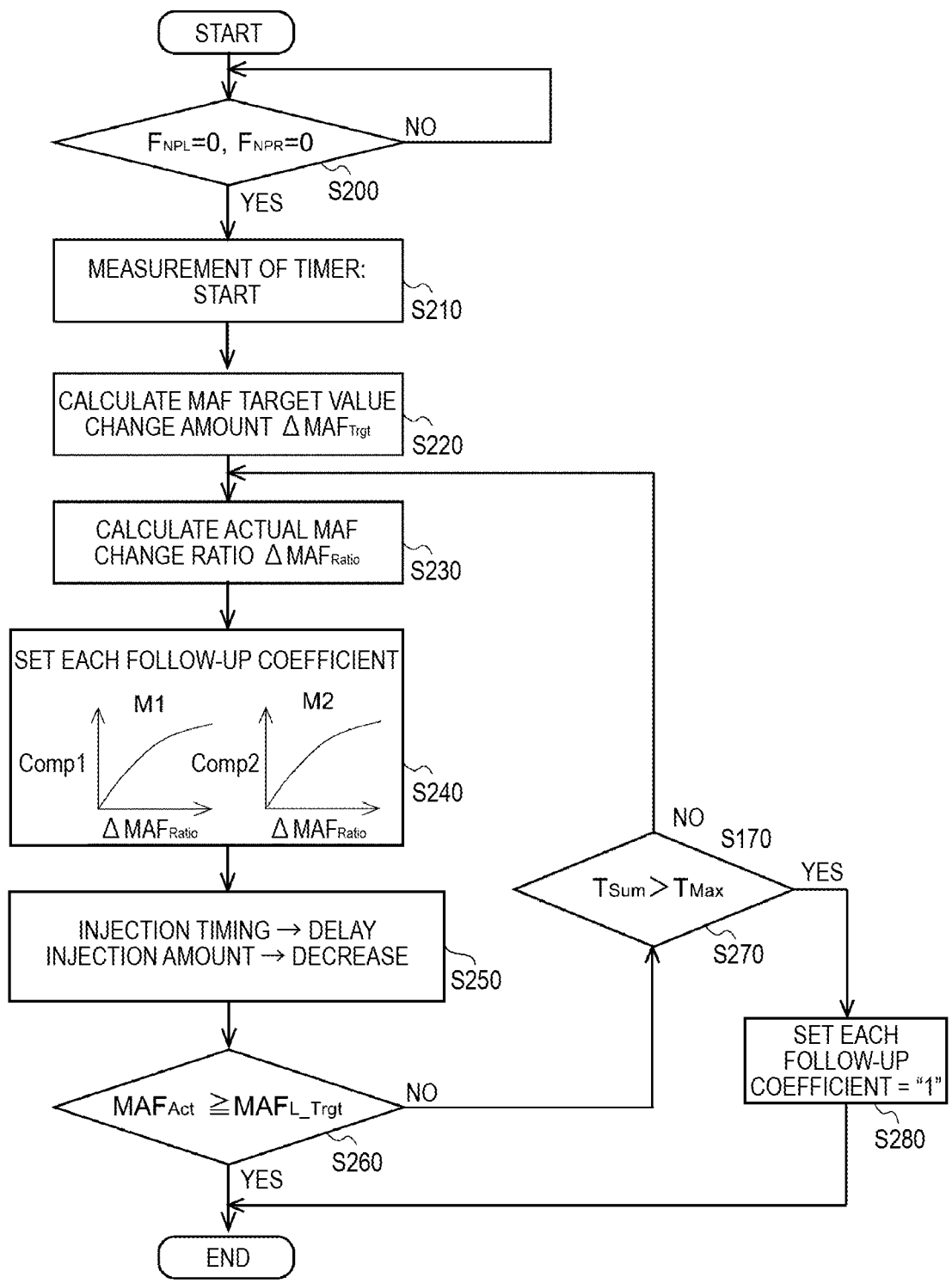
FIG. 7 is a flowchart depicting switching of the MAF follow-up control from the rich state to the lean state in accordance with the illustrative embodiment.

In order to avoid the above phenomena, as shown in flowcharts of FIGS. 5 and 7, the MAF follow-up control unit 80 executes MAF follow-up control of increasing or decreasing advance and delay of an injection timing and an injection amount, in correspondence to MAF change.

First, the MAF follow-up control upon start of the NOx purge lean control and start processing of the NOx purge rich control are described with reference to FIGS. 5 and 6.

In step S100, when the NOx purge lean flag $F_{NPL}$ becomes on, the NOx purge lean control of decreasing an intake air amount is started in step S110.

In step S120, an MAF target value change amount $\Delta MAF_{Trgt}$ ($=MAF_{NPL\_Trg}-MAF_{L\_Trgt}$) before and after the switching is calculated by subtracting an MAF target value $MAF_{L\_Trgt}$ before the switching (lean state) from an MAF target value $MAF_{NPL\_Trgt}$ after the switching (rich state).

In step S130, a current actual MAF change ratio $\Delta MAF_{Ratio}$ is calculated. More specifically, an actual MAF change amount $\Delta MAF_{Act}$ ($=MAF_{Act}-MAF_{L\_Trgt}$) from start of the MAF follow-up control until now is calculated by subtracting the MAF target value $MAF_{L\_Trgt}$ before the switching from a current actual MAF value $MAF_{Act}$ detected by the MAF sensor 40. Then, an actual MAF change ratio $\Delta MAF_{Ratio}$ ($=\Delta MAF_{Act}/\Delta MAF_{Trgt}$) is calculated by dividing the actual MAF change amount $\Delta MAF_{Act}$ by the MAF target value change amount $\Delta MAF_{Trgt}$ before and after the switching.

In step S140, a coefficient (hereinafter, referred to as 'injection timing follow-up coefficient $Comp_1$') for advancing or delaying the injection timing of each injector 11 and a coefficient (hereinafter, referred to as 'injection amount follow-up coefficient $Comp_2$') for increasing or decreasing the injection amount of each injector 11 are set in correspondence to the current actual MAF change ratio $\Delta MAF_{Ratio}$. More specifically, in a storage unit (not shown) of the ECU 50, an injection timing follow-up coefficient setting map M1, which prescribes a relation between the actual MAF change ratio $MAF_{Ratio}$ and the injection timing follow-up coefficient $Comp_1$ prepared in advance by a test and the like, and an injection amount follow-up coefficient setting map M2, which prescribes a relation between the actual MAF change ratio $MAF_{Ratio}$ and the injection amount follow-up coefficient $Comp_2$, are stored. The injection timing follow-up coefficient $Comp_1$ and the injection amount follow-up coefficient $Comp_2$ are set by reading values corresponding to the actual MAF change ratio $\Delta MAF_{Ratio}$ calculated in step S130 from the maps M1, M2, respectively.

In step S150, the injection timing of each injector 11 is advanced by an amount obtained by multiplying a target advance amount by the injection timing follow-up coefficient $Comp_1$, and the fuel injection amount of each injector 11 is also increased by an amount obtained by multiplying a target injection increased amount by the injection amount follow-up coefficient $Comp_2$.

Thereafter, in step S160, it is determined whether the current actual MAF value $MAF_{Act}$ detected by the MAF sensor 40 has reached the MAF target value $MAF_{NPL\_Trgt}$ after the switching (rich state). When it is determined that the actual MAF value $MAF_{Act}$ has not reached the MAF target value $MAF_{NPL\_Trgt}$ (No), the control returns to step S130 via step S170. That is, the processing of steps S130 to S150 is repeated until the actual MAF value $MAF_{Act}$ becomes the MAF target value $MAF_{NPL\_Trgt}$, so that the advance of the injection timing and the increase of the injection amount corresponding to the actual MAF change ratio $MAF_{Ratio}$ varying from hour to hour are continued.

In step S170, it is determined whether accumulated time $T_{Sum}$ measured from the start of the MAF follow-up control by a timer exceeds a predetermined upper limit time $T_{Max}$.

When shifting from the lean state to the rich state, the actual MAF value $MAF_{Act}$ may not follow the MAF target value $MAF_{L\_R\_Trgt}$ during the shift time period due to valve control delay and the like, so that the actual MAF value $MAF_{Act}$ may be maintained at a value higher than the MAF target value $MAF_{L\_R\_Trgt}$. If the MAF follow-up control is continuously performed at this state, the actual fuel injection amount is not increased to the target injection amount and the combustion of the engine 10 becomes unstable, so that torque variation and deterioration of drivability and the like may be caused.

In the illustrative embodiment, in order to avoid the above situation, when it is determined in step S170 that the accumulated time $T_{Sum}$ exceeds the upper limit time $T_{Max}$ (Yes), i.e., when the actual MAF value $MAF_{Ref}$ does not change by a predetermined value or greater over a predetermined time period, the control proceeds to step S180, and the injection timing follow-up coefficient $Comp_1$ and the injection amount follow-up coefficient $Comp_2$ are forcibly set to "1". Thereby, the MAF follow-up control is forcibly ended, so that it is possible to effectively prevent the torque variation and the deterioration of drivability.

On the other hand, when it is determined in step S160 that the actual MAF value $MAF_{Ref}$ has reached the MAF target value $MAF_{NPL\_Trgt}$ (Yes), the control proceeds to step S190 so as to start the NOx purge rich control and the NOx purge rich flag $F_{NPR}$ becomes on.

Figure 6:
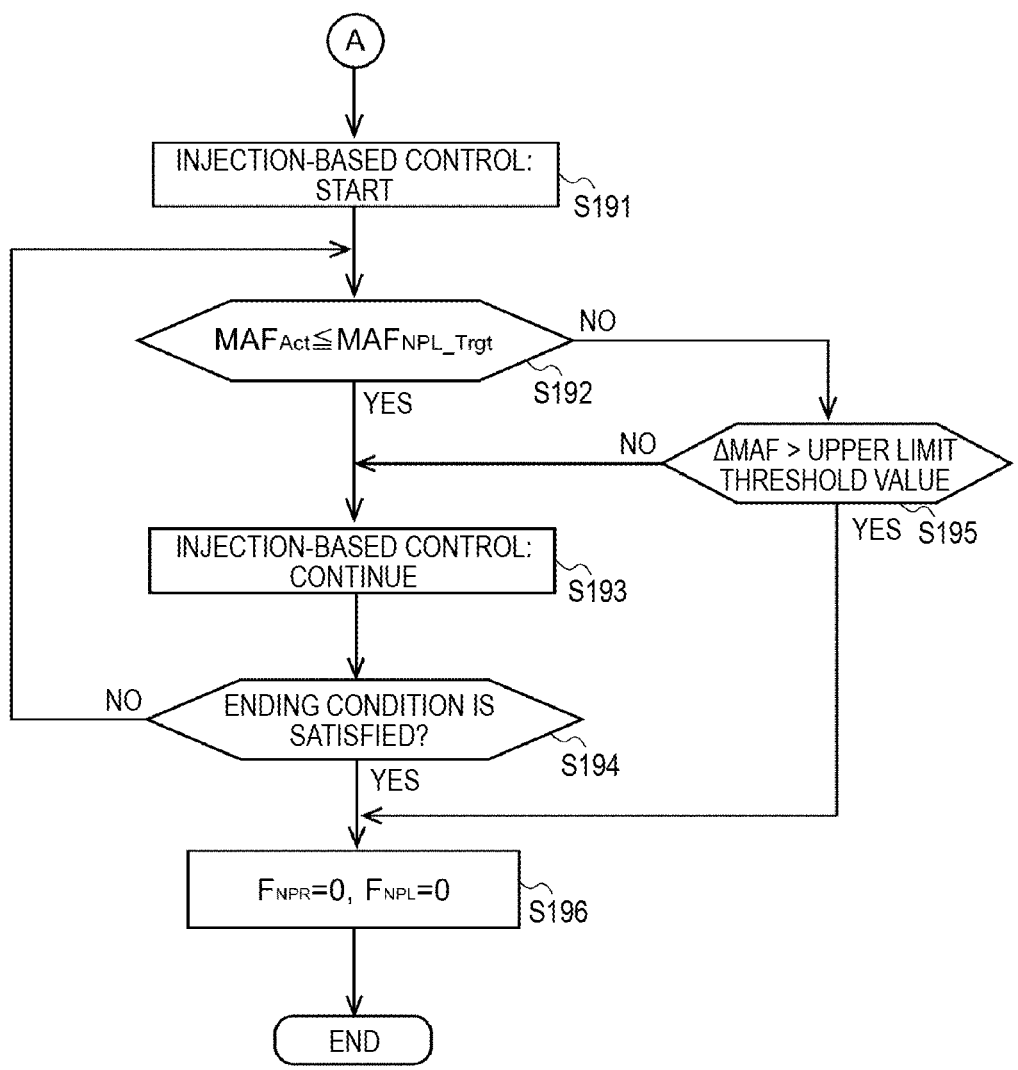
FIG. 6 is a flowchart depicting start processing of NOx purge rich control in accordance with the illustrative embodiment.

When the NOx purge rich flag $F_{NPR}$ becomes on, the control proceeds to step S191 shown in FIG. 6.

In step S191, the NOx purge rich control of increasing the fuel injection amount by the post injection or the exhaust pipe injection on the basis of the target injection amount $Q_{NPR\_Trgt}$ is started.

In step S192, during the execution of the NOx purge rich control, it is determined whether the actual MAF value $MAF_{Act}$ detected by the MAF sensor 40 becomes the MAF target value $MAF_{NPL\_Trgt}$ or smaller of the NOx purge lean control.

When it is determined that the actual MAF value $MAF_{Act}$ is maintained at the MAF target value $MAF_{NPL\_Trgt}$ or smaller (Yes), the control proceeds to step S193 and the NOx purge rich control is continuously performed. The processing of steps S192 and S193 is repeatedly executed until the ending condition of the NOx purge control is satisfied in step S194.

On the other hand, when it is determined in step S192 that the actual MAF value $MAF_{Act}$ is increased above the MAF target value $MAF_{NPL\_Trgt}$ (No), the control proceeds to step S195 and it is determined whether an increased amount $\Delta MAF_{INC}$ (=$MAF_{Act}$-$MAF_{NPL\_Trgt}$) of the actual MAF value $MAF_{Act}$ relative to the MAF target value $MAF_{NPL\_Trgt}$ exceeds a predetermined upper limit threshold value $\Delta MAF_{MAX}$.

In a case where it is determined that the increased amount $\Delta MAF_{INC}$ exceeds the upper limit threshold value $\Delta MAF_{MAX}$ (Yes), it is not possible to decrease the exhaust to the lambda necessary for the NOx purge even though the NOx purge rich control is continuously performed. In this case, in order to suppress the useless fuel consumption, the NOx purge rich control and the NOx purge lean control are forcibly ended (or stopped) in step S196, so that the control is over.

On the other hand, in a case where it is determined that the increased amount $\Delta MAF_{INC}$ is within the range of the upper limit threshold value $\Delta MAF_{MAX}$, if the NOx purge rich control is immediately ended, the exhaust rich injection performed until that moment becomes useless, so that the fuel consumption may be deteriorated. In this case, the control proceeds to step S193 so as to continue the NOx purge rich control. That is, when the increased amount $\Delta MAF_{INC}$ is a minor amount, the NOx purge rich control is continuously performed.

In this way, in the illustrative embodiment, the NOx purge rich control is started after the actual MAF value $MAF_{Act}$ is reliably decreased to the MAF target value $MAF_{NPL\_Trgt}$ by the NOx purge lean control. Therefore, it is possible to effectively prevent the useless exhaust rich injection, thereby reliably improving the fuel consumption.

Also, even when the actual MAF value $MAF_{Act}$ increases after the start of the NOx purge rich control, if the increased amount $\Delta MAF_{INC}$ is a minor amount, the NOx purge rich control is continued, so that it is possible to reliably prevent the NOx purge control from being frequently stopped.

Subsequently, the MAF follow-up control that is to be performed upon switching from the rich state to the lean state as the NOx purge control is over is described with reference to FIG. 7.

In step S200, when the NOx purge rich flag $F_{NPR}$ and the NOx purge lean flag $F_{NPL}$ become off, time measurement by the timer is started so as to measure an elapsed time period of the MAF follow-up control in step S210.

In step S220, an MAF target value change amount $\Delta MAF_{Trgt}$ (=$MAF_{L\_Trgt}$-$MAF_{NPL\_Trgt}$) before and after the switching is calculated by subtracting the MAF target value $MAF_{NPL\_Trgt}$ before the switching (rich state) from the MAF target value $MAF_{L\_Trgt}$ after the switching (lean state).

In step S230, a current actual MAF change ratio $\Delta MAF_{Ratio}$ is calculated. More specifically, the actual MAF change amount $\Delta MAF_{Act}$ (=$MAF_{Act}$-$MAF_{NPL\_Trgt}$) from start of the MAF follow-up control until now is calculated by subtracting the MAF target value $MAF_{NPL\_Trgt}$ before the switching from a current actual MAF value $MAF_{Act}$ detected by the MAF sensor 40. Then, an actual MAF change ratio $\Delta MAF_{Ratio}$ (=$\Delta MAF_{Act}/\Delta MAF_{Trgt}$) is calculated by dividing the actual MAF change amount $\Delta MAF_{Act}$ by the MAF target value change amount $\Delta MAF_{Trgt}$ before and after the switching.

In step S240, a value corresponding to the actual MAF change ratio $\Delta MAF_{Ratio}$ is read as the injection timing follow-up coefficient $Comp_1$ from the injection timing follow-up coefficient setting map M1 and a value corresponding to the actual MAF change ratio $\Delta MAF_{Ratio}$ is read as the injection amount follow-up coefficient $Comp_2$ from the injection amount follow-up coefficient setting map M2.

In step S250, the injection tuning of each injector 11 is delayed by an amount obtained by multiplying a target delay amount by the injection timing follow-up coefficient $Comp_1$, and the fuel injection amount of each injector 11 is also decreased by an amount obtained by multiplying a target injection decrease amount by the injection amount follow-up coefficient $Comp_2$.

Thereafter, in step S260, it is determined whether the current actual MAF value $MAF_{Act}$ detected by the MAF sensor 40 has reached the MAF target value $MAF_{L\_Trgt}$ after the switching (lean state). When it is determined that the actual MAF value $MAF_{Act}$ has not reached the MAF target value $MAF_{L\_Trgt}$ (No), the control returns to step S230 via step S270. That is, the processing of steps S230 to S250 is repeated until the actual MAF value $MAF_{Act}$ becomes the MAF target value $MAF_{L\_Trgt}$, so that the delay of the injection timing and the decrease of the injection amount corresponding to the actual MAF change ratio $MAF_{Ratio}$ varying from hour to hour are continued. The processing of step S270 will be described in detail later. On the other hand, when it is determined in step S260 that the actual MAF value $MAF_{Ref}$ has reached the MAF target value $MAF_{L\_Trgt}$ (Yes), the control is over.

In step S270, it is determined whether the accumulated time $T_{Sum}$ measured from the start of the MAF follow-up control by the timer exceeds the predetermined upper limit time $T_{Max}$.

When shifting from the lean state to the rich state, the actual MAF value $MAF_{Act}$ may not follow the MAF target value $MAF_{L-R\_Trgt}$ during the shift time period due to valve control delay and the like, so that the actual MAF value $MAF_{Act}$ may be maintained at a value smaller than the MAF target value $MAF_{L-R\_Trgt}$. If the MAF follow-up control is continuously performed at this state, the actual fuel injection amount is increased above the target injection amount, so that torque variation and deterioration of drivability and the like may be caused.

In the illustrative embodiment, in order to avoid the above situation, when it is determined in step S270 that the accumulated time $T_{Sum}$ exceeds the upper limit time $T_{Max}$ (Yes), i.e., when the actual MAF value $MAF_{Ref}$ does not change by a predetermined value or greater over a predetermined time period, the control proceeds to step S280, and the injection timing follow-up coefficient $Comp_1$ and the injection amount follow-up coefficient $Comp_2$ are forcibly set to "1". Thereby, the MAF follow-up control is forcibly ended, so that it is possible to effectively prevent the torque variation and the deterioration of drivability.

[Injection Amount Learning Correction]

Figure 8:
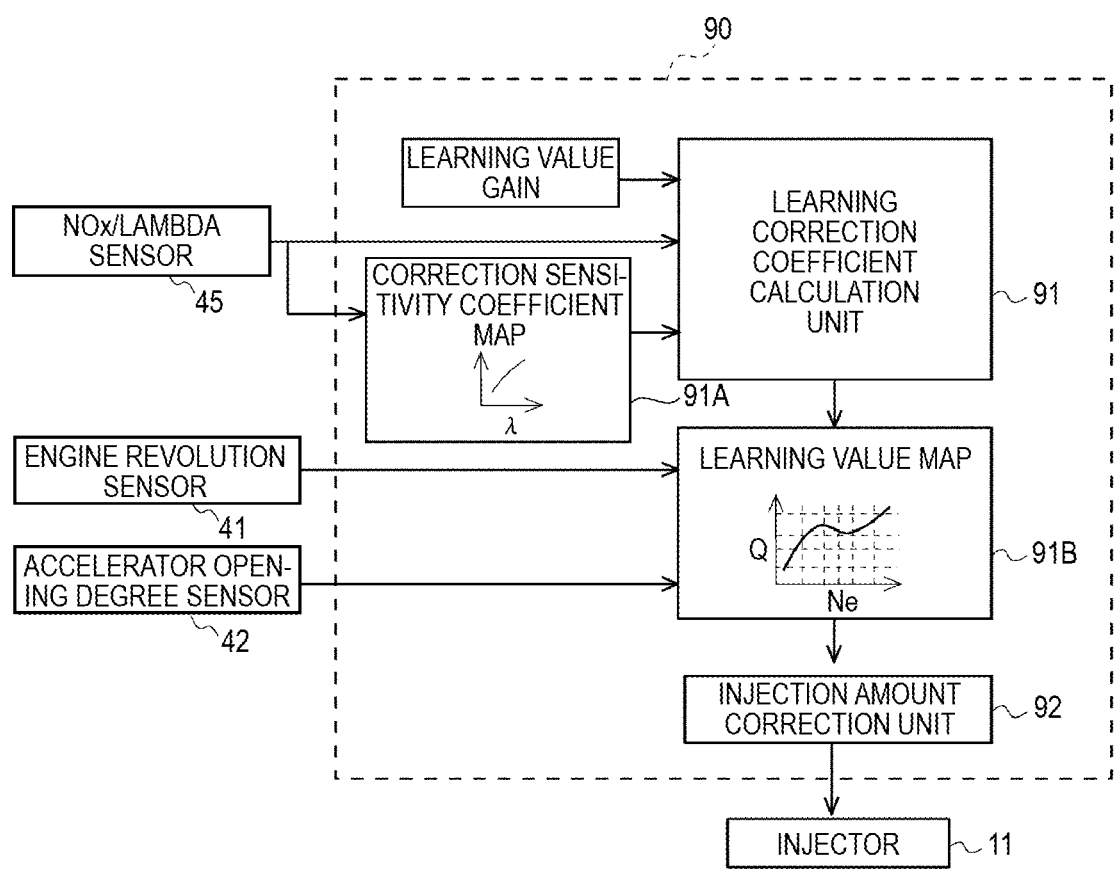
FIG. 8 is a block diagram depicting injection amount learning correction processing of an injector in accordance with the illustrative embodiment.

As shown in FIG. 8, the injection amount learning correction unit 90 includes a learning correction coefficient calculation unit 91 and an injection amount correction unit 92.

Figure 9:
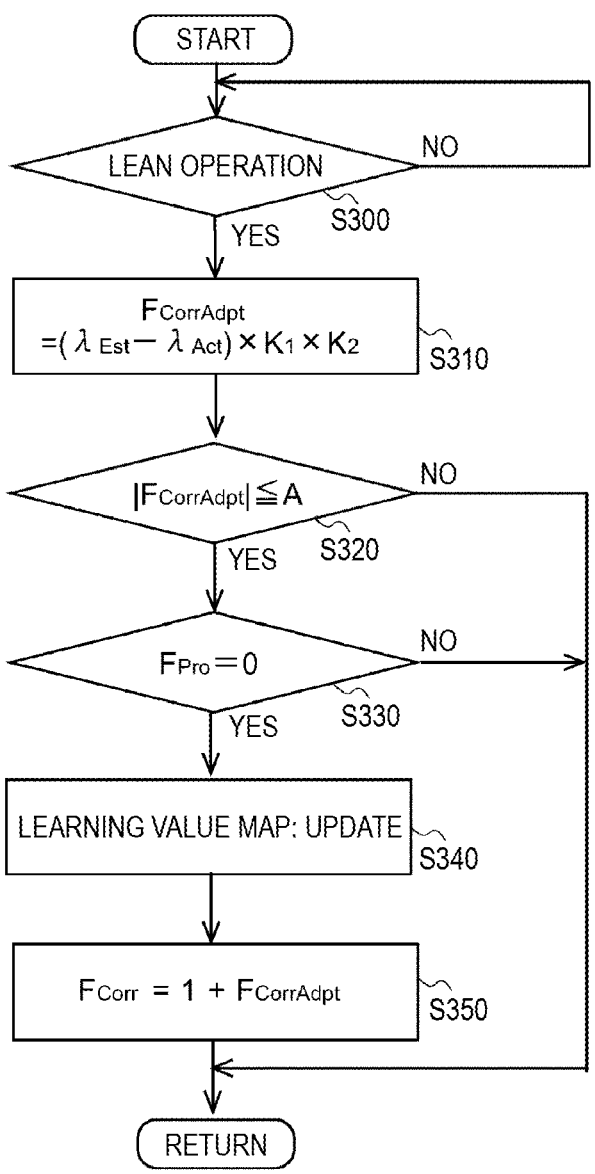
FIG. 9 is a flowchart depicting learning correction coefficient calculation processing in accordance with the illustrative embodiment.

The learning correction coefficient calculation unit 91 is configured to calculate a learning correction coefficient $F_{Corr}$ of the fuel injection amount, based on an error $\Delta\lambda$ between an actual lambda value $\lambda_{Act}$, which is to be detected by the NOx/lambda sensor 45 upon lean operation of the engine 10, and an estimated lambda value $\lambda_{Est}$. When the exhaust is in the lean state, an HC concentration in the exhaust is very small, so that a change in exhaust lambda value due to an oxidation reaction of HC in the oxidation catalyst 31 is negligibly small. For this reason, it is thought that the actual lambda value $\lambda_{Act}$ in the exhaust, which passes through the oxidation catalyst 31 and is detected by the downstream-side NOx/lambda sensor 45, coincides with the estimated lambda value $\lambda_{Est}$ in the exhaust emitted from the engine 10. For this reason, when the error $\Delta\lambda$ occurs between the actual lambda value $\lambda_{Act}$ and the estimated lambda value $\lambda_{Est}$, it can be assumed that the error is caused due to a difference between an instructed injection amount to each injector 11 and an actual injection amount. In the below, learning correction coefficient calculation processing, which is to be performed using the error $\Delta\lambda$ by the learning correction coefficient calculation unit 91, is described with reference to a flowchart of FIG. 9.

In step S300, it is determined whether the engine 10 is in a lean operating state, based on the engine revolution Ne and the accelerator opening degree Q. When it is determined that the engine is in the lean operating state, the learning correction coefficient calculation unit proceeds to step S310 so as to start learning correction coefficient calculation.

In step S310, a learning value $F_{CorrAdpt}$ is calculated ($F_{CorrAdpt}=(\lambda_{Est}-\lambda_{Act})\times K_1 \times K_2$) by multiplying the error $\Delta\lambda$, which is obtained by subtracting the actual lambda value $\lambda_{Act}$ detected at the NOx/lambda sensor 45 from the estimated lambda value $\lambda_{Est}$, by a learning value gain $K_1$ and a correction sensitivity coefficient $K_2$. The estimated lambda value $\lambda_{Est}$ is estimated and calculated from the operating state of the engine 10 corresponding to the engine revolution Ne and the accelerator opening degree Q. Also, the correction sensitivity coefficient $K_2$ is read from a correction sensitivity coefficient map 91A shown in FIG. 8, in response to the actual lambda value $\lambda_{Act}$ detected at the NOx/lambda sensor 45, which is an input signal.

In step S320, it is determined whether an absolute value $|F_{CorrAdpt}|$ of the learning value $F_{CorrAdpt}$ is within a range of a predetermined correction limit value A. When it is determined that the absolute value $|F_{CorrAdpt}|$ exceeds the correction limit value A, the control returns and this learning is stopped.

In step S330, it is determined whether a learning prohibition flag $F_{Pro}$ is off. As the learning prohibition flag $F_{Pro}$, for example, a transient operation of the engine 10, the NOx purge control ($F_{NP}=1$) and the like are exemplified. The reason is that when the corresponding conditions are satisfied, the error $\Delta\lambda$ increases due to a change in the actual lambda value $\lambda_{Act}$, so that the correct learning cannot be performed. Regarding the determination as to whether the engine 10 is in the transient operation, based on a temporal change amount of the actual lambda value $\lambda_{Act}$ detected at the NOx/lambda sensor 45, when the temporal change amount is greater than a predetermined threshold value, it may be determined that the engine is in the transient operation.

In step S340, a learning value map 91B (refer to FIG. 8), which is to be referred to on the basis of the engine revolution Ne and the accelerator opening degree Q, is updated to the learning value $F_{CorrAdpt}$ calculated in step S310. More specifically, in the learning value map 91B, a plurality of learning regions divided in correspondence to the engine revolution Ne and the accelerator opening degree Q is set. The learning regions are preferably set to be narrower as use frequencies thereof are higher and to be wider as use frequencies thereof are lower. Thereby, the learning accuracy is improved in the region of which use frequency is high and it is possible to effectively prevent the non-learning in the region of which use frequency is low.

In step S350, in response to the engine revolution Ne and the accelerator opening degree Q, which are input signals, "1" is added to the learning value read from the learning value map 91B, so that a learning correction coefficient $F_{Corr}$ is calculated ($F_{Corr}=1+F_{CorrAdpt}$). The learning correction coefficient $F_{Corr}$ is input to the injection amount correction unit 92 shown in FIG. 8.

The injection amount correction unit 92 multiplies respective basic injection amounts of pilot injection $Q_{Pilot}$, pre-injection $Q_{Pre}$, main injection $Q_{Main}$, after-injection $Q_{After}$ and post injection $Q_{Post}$ by the learning correction coefficient $F_{Corr}$, thereby correcting the fuel injection amount.

In this way, the fuel injection amount to each injector 11 is corrected by the learning value corresponding to the error $\Delta\lambda$ between the estimated lambda value $\lambda_{Est}$ and the actual lambda value $\lambda_{Act}$, so that it is possible to effectively exclude the non-uniformity such as aging degradation, characteristic change, individual difference and the like of each injector 11.

[MAF Correction Coefficient]

The MAF correction coefficient calculation unit 95 is configured to calculate an MAF correction coefficient $Maf_{corr}$, which is to be used for the setting of the MAF target value $MAF_{NPL\_Trgt}$ and the target injection amount $Q_{NPR\_Trgt}$ upon the NOx purge control.

In the illustrative embodiment, the fuel injection amount of each injector 11 is corrected on the basis of the error $\Delta\lambda$ between the actual lambda value $\lambda_{Act}$ detected at the NOx/lambda sensor 45 and the estimated lambda value $\lambda_{Est}$. However, since the lambda is a ratio of air and fuel, it cannot be said that the error $\Delta\lambda$ is necessarily caused due to the difference between the instructed injection amount to each injector 11 and the actual injection amount. That is, the error $\Delta\lambda$ of the lambda may be influenced not only by each injector 11 but also an error of the MAF sensor 40.

Figure 10:
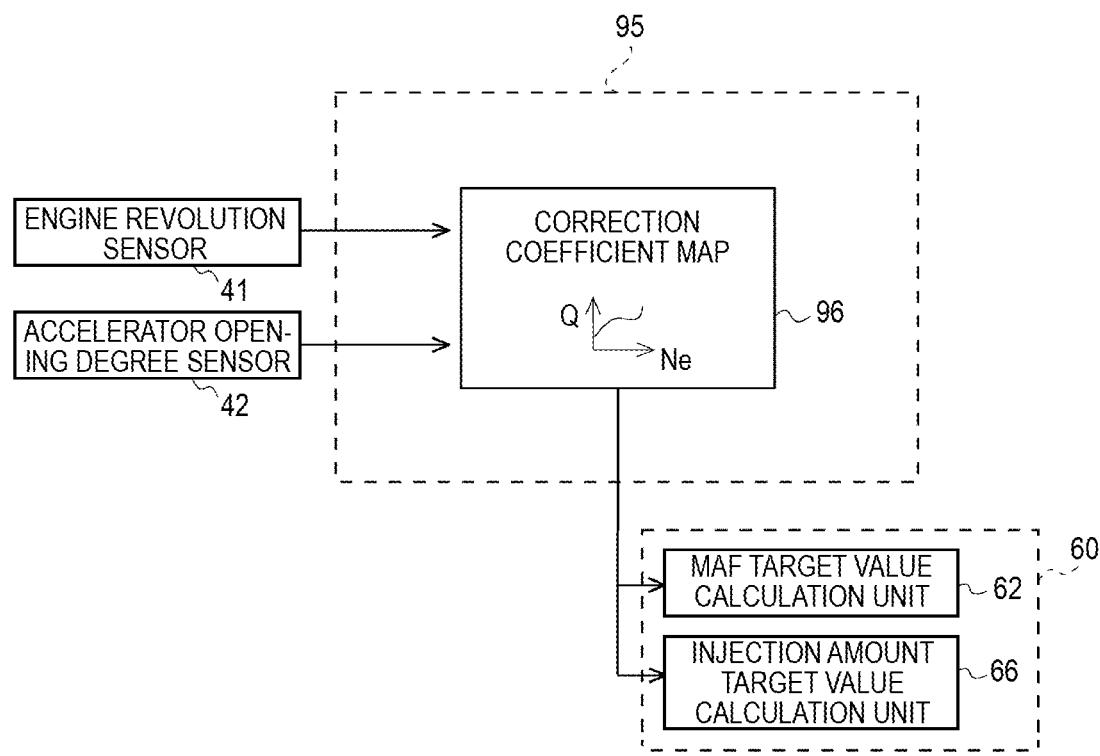
FIG. 10 is a block diagram depicting MAF correction coefficient setting processing in accordance with the illustrative embodiment.

FIG. 10 is a block diagram depicting setting processing of the MAF correction coefficient $Maf_{corr}$, which is to be performed by the MAF correction coefficient calculation unit 95. A correction coefficient setting map 96 is a map that is to be referred to on the basis of the engine revolution Ne and the accelerator opening degree Q, and an MAF correction coefficient $Maf_{corr}$ indicative of a sensor characteristic of the MAF sensor 40 corresponding to the engine revolution Ne and the accelerator opening degree Q is set in advance by a test and the like.

The MAF correction coefficient calculation unit 95 is configured to read the MAF correction coefficient $Maf_{corr}$ from the correction coefficient setting map 96, in response to the engine revolution Ne and the accelerator opening degree Q, which are input signals, and to transmit the MAF correction coefficient $Maf_{corr}$ to the MAF target value calculation unit 62 and the injection amount target value calculation unit 76. Thereby, it is possible to effectively reflect the sensor characteristics of the MAF sensor 40 when setting the MAF target value $MAF_{NPL\_Trgt}$ and the target injection amount $Q_{NPR\_Trgt}$ upon the NOx purge control.

[Others]

The present invention is not limited to the above embodiment and can be implemented with being appropriately modified without departing from the spirit of the present invention.

The subject application is based on a Japanese Patent Application No. 2015-050412 filed on Mar. 13, 2015, the entire contents of which are incorporated herein by reference.

INDUSTRIAL APPLICABILITY

The exhaust purification system of the present invention has an effect of reliably preventing the injection-based control from being started before the intake air amount is decreased to the target intake air amount by the air-based control, and is useful in that it is possible to effectively suppress the deterioration in fuel consumption.

REFERENCE SIGNS LIST

10: engine
11: injector
12: intake passage
13: exhaust passage
16: intake air throttle valve
24: EGR valve
31: oxidation catalyst
32: NOx-occlusion-reduction-type catalyst
33: filter
34: exhaust pipe injection device
40: MAF sensor
45: NOx/lambda sensor
50: ECU

The invention claimed is:

1. An exhaust purification system comprising:
a NOx catalyst provided in an exhaust passage of an internal combustion engine and configured to purify NOx in exhaust;
acquisition means for acquiring an air flow-rate of the internal combustion engine; and
catalyst regeneration means for executing catalyst regeneration treatment of recovering a NOx purification capacity of the NOx catalyst by performing, in combination, air-based control of reducing the air flow-rate of the internal combustion engine to a predetermined target air flow-rate and injection-based control of increasing a fuel injection amount,
wherein, in a case of executing the catalyst regeneration treatment, the catalyst regeneration means starts with the air-based control so as to lower an air excess ratio from a value upon normal operation to a first target air excess ratio, and starts the injection-based control so as to lower the air excess ratio from the first target air excess ratio to a second target air excess ratio after the air flow-rate acquired by the acquisition means is reduced to the predetermined target air flow-rate, and
wherein after starting the injection-based control, the catalyst regeneration means continues the injection-based control in a case when an increased amount of the air flow-rate acquired by the acquisition means relative to the target air flow-rate is equal to or smaller than a predetermined threshold value, and forcibly ends the injection-based control in a case where the increased amount of the air flow-rate acquired by the acquisition means relative to the target air flow-rate exceeds the predetermined threshold value.

2. An exhaust purification system comprising:
a NOx catalyst provided in an exhaust passage of an internal combustion engine and configured to purify NOx in exhaust;
an air flow sensor configured to acquire an air flow-rate of the internal combustion engine; and
a controller,
wherein the controller is operated to execute catalyst regeneration treatment of recovering a NOx purification capacity of the NOx catalyst by performing, in combination, air-based control of reducing the air flow-rate of the internal combustion engine to a predetermined target air flow-rate and injection-based control of increasing a fuel injection amount,
wherein, in a case of executing the catalyst regeneration treatment, the controller starts with the air-based control so as to lower an air excess ratio from a value upon normal operation to a first target air excess ratio, and starts the injection-based control so as to lower the air excess ratio from the first target air excess ratio to a second target air excess ratio after the air flow-rate acquired by the air flow sensor is reduced to the predetermined target air flow-rate, and
wherein after starting the injection-based control, the controller continues the injection-based control in a case where an increased amount of the air flow-rate acquired by the air flow sensor relative to the target air flow-rate is equal to or smaller than a predetermined threshold value, and forcibly ends the injection-based control in a case where the increased amount of the air flow-rate acquired by the air flow sensor relative to the target air flow-rate exceeds the predetermined threshold value.

3. An exhaust purification system comprising:
a NOx catalyst provided in an exhaust passage of an internal combustion engine and configured to purify NOx in exhaust;
an air flow sensor configured to acquire an air flow-rate of the internal combustion engine; and
a controller,
wherein the controller is operated to execute catalyst regeneration treatment of recovering a NOx purification capacity of the NOx catalyst by performing, in combination, air-based control of reducing the air flow-rate of the internal combustion engine to a predetermined target air flow-rate and injection-based control of increasing a fuel injection amount,
wherein, in a case of executing the catalyst regeneration treatment, the controller starts with the air-based control and starts the injection-based control when the air flow-rate acquired by the air flow sensor is reduced to the predetermined target air flow-rate, and
wherein after starting the injection-based control, the controller continues the injection-based control in a case where an increased amount of the air flow-rate acquired by the air flow sensor relative to the target air flow-rate is equal to or smaller than a predetermined threshold value, and forcibly ends the injection-based control in a case where the increased amount of the air flow-rate acquired by the air flow sensor relative to the target air flow-rate exceeds the predetermined threshold value.

* * * * *